United States Patent [19]

Fetty et al.

[11] Patent Number: 4,609,022

[45] Date of Patent: Sep. 2, 1986

[54] PNEUMATIC TIRE

[75] Inventors: Harold D. Fetty, Birmingham, Mich.; Daniel J. Lindner, Canal Fulton, Ohio

[73] Assignee: The Goodyear Tire & Rubber Company, Akron, Ohio

[21] Appl. No.: 687,488

[22] Filed: Dec. 28, 1984

Related U.S. Application Data

[63] Continuation of Ser. No. 476,306, Mar. 17, 1983, abandoned.

[51] Int. Cl.$^4$ .............................................. B60C 11/06
[52] U.S. Cl. ............................... 152/209 R; D12/142
[58] Field of Search ................ 152/209; D12/141-151

[56] References Cited

U.S. PATENT DOCUMENTS

| Re. 30,549 | 3/1981 | Mirtain et al. | 152/361 R |
| D. 223,426 | 4/1972 | Granger et al. | D12/149 |
| D. 233,226 | 10/1974 | Smajd | D12/149 |
| D. 243,757 | 3/1977 | Hayakawa et al. | D12/142 |
| D. 248,293 | 6/1978 | Hayakawa et al. | D12/146 |
| D. 264,455 | 5/1982 | Hart | D12/147 |
| D. 265,186 | 6/1982 | Karlyn et al. | D12/147 |
| 3,584,670 | 6/1971 | Verdier | 152/209 R |

FOREIGN PATENT DOCUMENTS 2232454 1/1975 France.
1524364 9/1978 United Kingdom.

OTHER PUBLICATIONS

Nabholz, "Die Grosse Aufgabe der Jugend", Gummiiberetfung, vol. 48, No. 2, Feb., 1972, pp. 23-33 (depicted Figs. only).

Primary Examiner—Lois E. Boland
Attorney, Agent, or Firm—L. R. Drayer

[57] ABSTRACT

A pneumatic radial passenger tire having a ground-engaging tread portion and a pair of axially opposed tread edges. The tread portion comprising at least two circumferentially continuous grooves formed by alternately disposed axially and circumferentially extending segments. Each of the segments have a particular angle orientation. There is also provided additional grooves connecting the circumferentially extending grooves and which extend from the axially outer circumferential grooves to the tread edge.

2 Claims, 3 Drawing Figures

PNEUMATIC TIRE

This is a continuation of application Ser. No. 476,306, filed Mar. 17, 1983, now abandoned.

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

The present invention relates to pneumatic tires and more particularly to a novel tread configuration for passenger tires of the radial type construction.

The tread portion of a tire is defined by a plurality of grooves which form ground-engaging relief elements. The particular configuration of these relief elements has a significant affect upon dry traction, wet traction, snow traction, noise level and rolling resistance of the tire. It is well known in the art that the obtaining of certain performance characteristics are obtained at the sacrifice of other performance characteristics. For example, generally a tire which has good traction and handling and all season performance is provided at the expense of noise level, wear characteristics and a tire which has good wear is provided at the expense of handling and traction.

Applicants have discovered a new tread configuration which has low noise characteristics while also maintaining good tread wear, dry traction, wet traction, handling and all season performance.

DETAILED DESCRIPTION OF THE DRAWINGS

Figure 1:
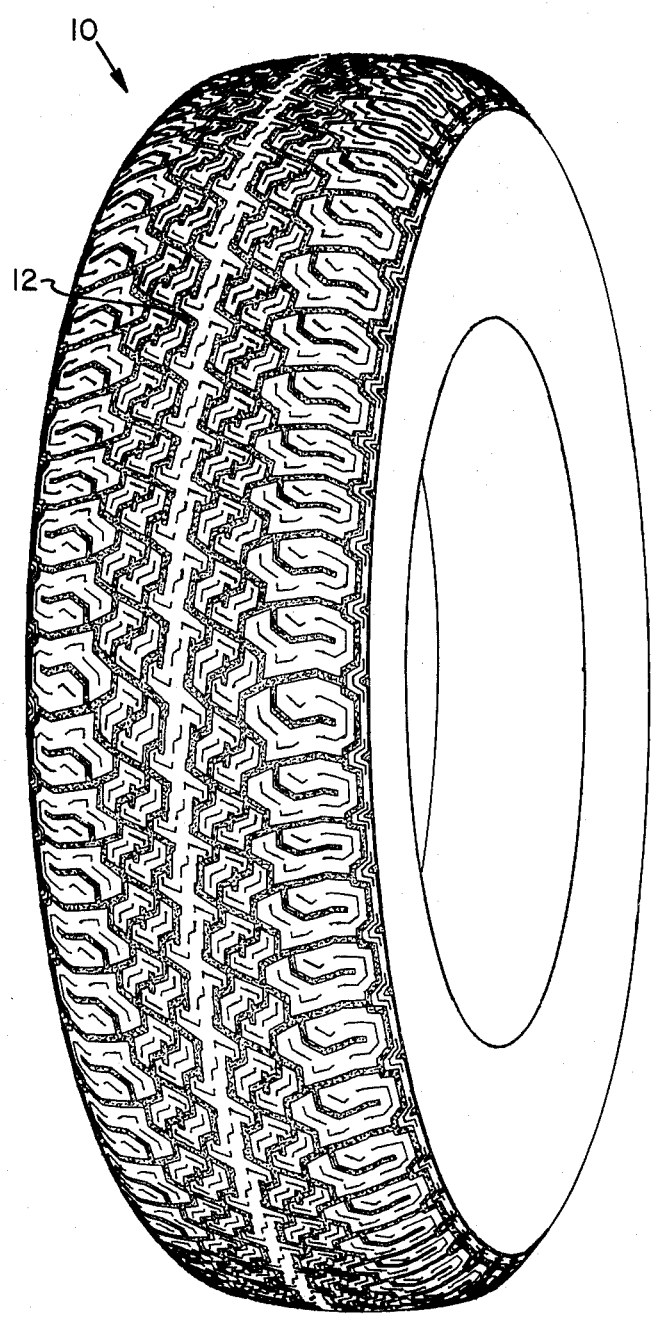
FIG. 1 is a perspective view of a tire having a tread pattern made in accordance with the present invention.
Figure 2:
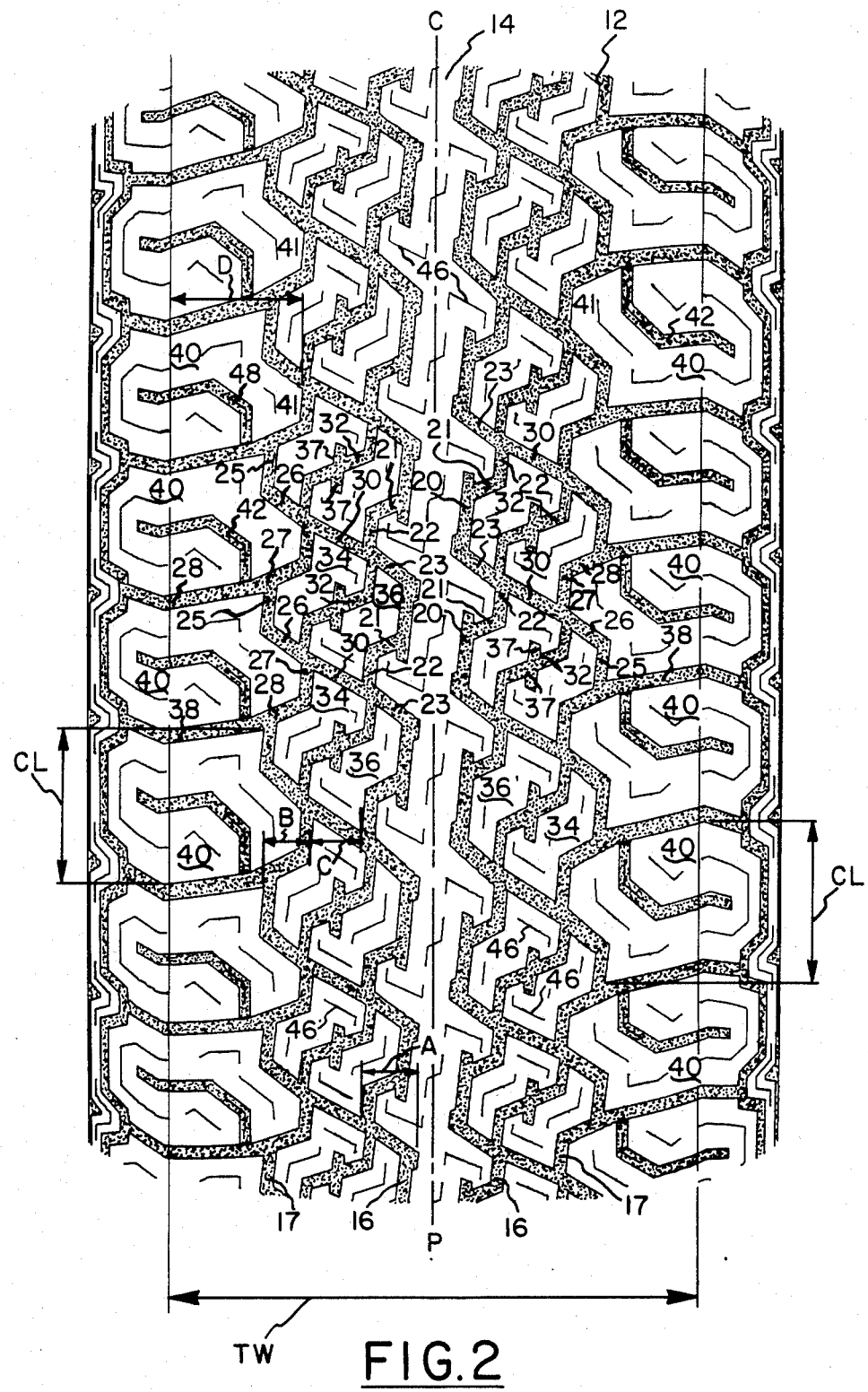
FIG. 2 is an enlarged fragmentary plan view of the tread portion of FIG. 1.

Referring to FIGS. 1 and 2, there is illustrated a pneumatic tire having a ground engaging tread portion 12. The tire of the present invention is designed to be used with passenger vehicles and is of the radial type construction. For the purposes of this invention, a radial tire is a tire in which the reinforcing cords of the carcass ply structure are oriented at an angle with respect to the mid-circumferential centerplane CP of the tire in the range of about 75° to 90°.

The tread portion 12 comprises a circumferentially extending rib 14 which extends about the entire circumference of the tire 10. The rib 14 is disposed substantially in the center portion of the tread 12. Disposed on each axial side of rib 14 there is provided a pair of circumferentially continuous grooves 16 and 17 respectively spaced axially apart. The grooves 16 being adjacent the circumferentially extending ribs 14. Each of said grooves 16 and 17 comprises of a plurality of alternating circumferentially and axially extending segments. Each groove 16 is provided with a first circumferentially extending segment 20 which is oriented at an angle between 2° and 20° with respect to the mid-circumferential centerplane of the tire, preferably between 5° and 11°. In the particular embodiment illustrated, the segment 20 is oriented at an angle of approximately 6° with respect to the mid-circumferential centerplane CP. Extending from substantially one end of segment 20, there is provided a first axially extending segment 21 which extends axially outwardly from segment 20 and is oriented at an angle in the range of 60° to 80° and preferably, from 70° to 75° with respect to the mid-circumferential centerplane CP of the tire. In the particular embodiment illustrated, the segment 21 is oriented at an angle of about 71°. The segment 21 is oriented such that the axially outer end extends in a circumferential direction away from segment 20. Segment 21 preferably has a length less than said first segment 20, generally about one-half the length of segment 20.

Extending from the axially outer end of segment 21, there is provided a second circumferentially extending segment 22 disposed at an angle in the same range as segment 20 and is preferably, parallel to segment 20. Circumferentially extending segment 22 preferably has a length less than that of segment 20, generally segment 22 has a length approximately one-half the length of segment 20.

Extending from the other end of segment 22 there is provided a second axially extending segment 23 which is oriented at an angle in the range of 40° to 70° with respect to the mid-circumferential centerplane CP of the tire, preferably between 50° and 60°. In the particular embodiment illustrated, segment 23 is oriented at an angle of approximately 53°. The segment 23 is oriented such that the other end is disposed axially inward of the end which joins segment 22. The axially inner end of segment 22 meets another segment 20. The segments repeat about the circumference of the tire.

Each groove 17 is substantially identical to groove 16 except that it is out phase with groove 17. Groove 17 comprises segments 25, 26, 27 and 28 such that segment 25 corresponds to segment 20, segment 26 corresponds to segment 21, segment 27 corresponds to segment 22 and segment 28 corresponds to segment 23 of groove 16. Each segment 25, 26, 27 and 28 being oriented in the same range of angles as its corresponding segment in groove 16. Groove 17, like groove 16, then repeats the sequence about the circumference of the tire. Groove 17 is out of phase with respect to groove 16 such that axially extending groove segment 30, having substantially the same angle as segment 26 and 23, extends between groove 16 and groove 17 connecting segments 26 and 23.

Connecting the axially inner end of segment 26 with the axially outer end of the next circumferentially adjacent segment 23 opposite in direction to which groove 30 extends, there is provided a connecting groove 32 which is substantially parallel to both grooves 16 and 17. It can therefore be seen that independent blocks 34 and 36 are formed by grooves 16, 17, 32 and 30. In the particular embodiment illustrated, there is provided notched portions 37 in blocks 34 and 36 which are disposed in substantially the same circumferential plane which is perpendicular to the axis of rotation of the tire. However, these notched portions are not critical to the invention and may be omitted if desired.

Circumferential segments 20 and 22 of grove 16 and circumferential groove segments 25 and 27 of groove 17 have a length less than or equal to about 10% of the tread width TW. The length of axial groove segment 21 and 23 of groove 16 and segments 26 and 28 of groove 17 are such that the groove 16 traverses across the tread a distance A and the groove 17 traverses across the tread a distance B. The distances A and B being equal to or less than about 15% of the tread width TW, preferably less than about 10%. In the embodiment illustrated, the distances A and B are each about 8% of the tread width TW. The distances A and B are measured from the axially furthermost spaced point of the groove 16,17 respectively.

The grooves 16 and 17 on the same side of ribs 14 are spaced apart an axial distance c less than about 15% of the tread width TW, preferably of about 10%. In the shoulder region of the tire there is provided a plurality of substantially axially extending grooves 38 which extend from the juncture of segments 28 and 25 of groove 17. Grooves 38 are oriented at an angle of at least 70° to 90° with respect to the mid-circumferential centerplane of the tire and preferably, between 75° and 85°. In the particular embodiment illustrated, the grooves 38 are oriented at an angle of about 81°. Axially extending grooves 38 form a plurality of independent blocks 40 therebetween which have a circumferential length CL of between 20% to 35% of the tread width TW, preferably between 25% to 30%. In the particular embodiment illustrated, the length CL is 27% of the tread width TW. The axially inner end portion 41 of block 40 extends axially inward from the tread edge a distance D no greater than 35% of the tread width TW, preferably of at least 20%. In the particular embodiment illustrated, the axially inner end is spaced a distance D from the tread edge of approximately 25% of the tread width TW. The configuration of the shoulder elements significantly contribute to improved performance in noise level, all season performance, tread wear and handling characteristics.

In the particular embodiment illustrated, there is provided a groove 42 which starts in the general area of the juncture of segment 25 and 28 of groove 17 and being generally parallel to segments 28 and 26 of groove 17. Groove 42 has a depth no greater than approximately 50% of the depth of the grooves 38, 17, 16, 30 and 32 and in the particular embodiment illustrated is approximately 45%. It is important that the depth of this groove not be too deep as this would interfere with the rigidity of the shoulder blocks 40 which is an important aspect of the present invention.

For the purposes of this invention, grooves 38, 17, 16, 30 and 32 have a width sufficient such that when in the footprint of the tire, the grooves do not close up at the tread surface so as to provide water channeling passages.

Also for purposes of this invention, the tread width TW is the maximum axial width of the tread as measured from the footprint of the tire taken when the tire is inflated to design inflation pressure and at rated load. The tread edge being the axially outermost boundary of the ground-engaging tread portion.

Applicants have found that by providing a tread pattern in accordance with the present invention, a passenger tire could be made with a tread pattern with excellent noise level characteristics while also maintaining all season traction capabilities and good wear and handling characteristics.

In the particular embodiment illustrated in FIG. 2, there is provided a pluraltiy of narrow blades or sipes 46 in the blocks 36, 37, 40 and rib 14. These blades preferably do not extend to the peripheral edges of any of the independent elements 34, 36, 42 or central rib 14 so as to provide for stiffer elements for good handling and wear characteristics. These blades are of conventional construction and are well known to those skilled in the art and generally have a depth less than that of the main grooves 16 and 17.

Figure 3:
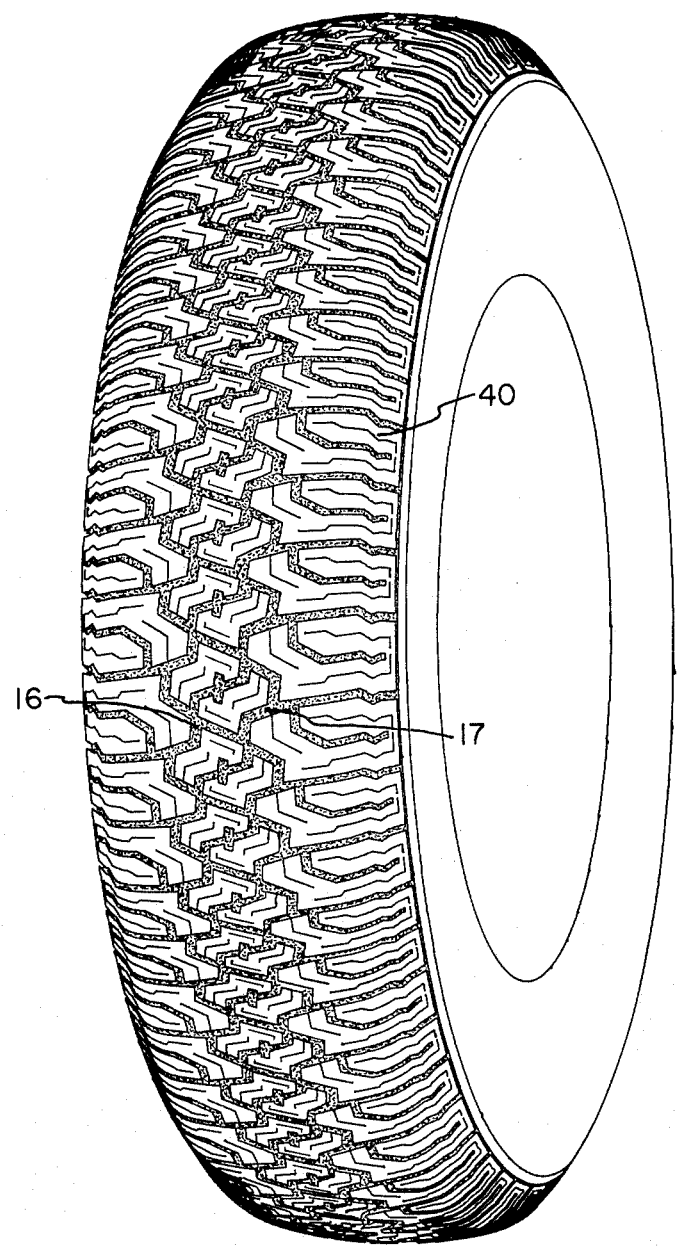
FIG. 3 is a perspective view of a tire having another tread pattern made in accordance with the present invention.

While certain representative embodiments and details have been shown for the purpose of illustrating the invention, it will be apparent to those skilled in the art that various changes and modifications may be made therein without departing from the spirit or scope of the invention. For example, referring to FIG. 3 there is illustrated a modified form of the present invention wherein the central rib 14 is omitted. However, the embodiment of FIGS. 1 and 2 with a centrally located circumferentially extending rib is preferred. The embodiment of FIG. 3 is provided with a pair of circumferentially extending grooves 16 and 17 and shoulder elements 40 as previously described with regard to FIG. 1.

We claim:

1. A pneumatic tire comprising a tread portion which extends about the entire circumference of the tire, said tread portion having at least one circumferentially continuous groove disposed on each side of a mid-circumferential centerplane of said tire, each said circumferentially continuous groove comprising a repeating of series of segments, each said series of segments comprising:
   (a) a first segment which is oriented at an angle of between 2° and 20° with respect to the mid-circumferential centerplane of the tire;
   (b) a second segment which is oriented at an angle in the range of 60° to 80° with respect to the mid-circumferential centerplane of the tire, an axially innermost end of each second segment communicating with an axially outermost end of a first segment;
   (c) a third segment oriented at an angle of between 2° and 20° with respect to the mid-circumferential centerplane of the tire, said third segment having a length that is less than the length of said first segment, an axially innermost end of said third segment communicating with an axially outermost end of a second segment; and
   (d) a fourth segment oriented at an angle in the range of 40° to 70° with respect to the mid-circumferential plane of the tire, an axially outermost end of said fourth segment communicating with an axially outermost end of a third segment, and an axially innermost end of a fourth segment communicating with an axially innermost end of a first segment;
   said first and third segments of each series of segments having a length less than or equal to about 10% of the width of the tread, said second and fourth segments of each series having a length such that the axially furthermost spaced points of each circumferentially continuous groove are separated by axial distances that are equal to or less than about 15% of the width of the tread, said circumferentially continuous grooves being out of phase with one another; each circumferentially continuous groove communicating with another circumferentially continuous groove through straight connecting grooves, and the axially outermost groove on each side of the tire's mid-circumferential plane communicating with the nearest axial edge of the tread through a connecting groove.

2. A pneumatic tire according to claim 1 wherein said tread portion further comprises a circumferntially extending rib which extends about the entire circumference of the tire, said rib being disposed substantially in the ce4nter portion of the tread.

* * * * *